United States Patent [19]

Stanton

[11] 4,304,252

[45] Dec. 8, 1981

[54] FLUSH MOUNTED SEA VALVE

[76] Inventor: Raymond E. Stanton, 332 Central Ave., Apt. C, Alameda, Calif. 94501

[21] Appl. No.: 86,752

[22] Filed: Oct. 22, 1979

[51] Int. Cl.³ .................... F16K 5/00; F16K 51/00
[52] U.S. Cl. ................................ 137/240; 137/123; 251/144; 251/315
[58] Field of Search ............... 251/315, 144; 137/238, 137/240, 123

[56] References Cited

U.S. PATENT DOCUMENTS

| 2,686,024 | 8/1954 | Zimmer | 251/144 |
| 3,006,602 | 10/1961 | Usab | 251/315 |
| 3,022,797 | 2/1962 | Allin | 251/144 |
| 3,228,412 | 1/1966 | Peterson et al. | 137/240 |
| 3,275,025 | 9/1966 | Kowalski | 251/315 |
| 3,528,447 | 9/1970 | Kolb | 137/240 |
| 3,591,131 | 7/1971 | Carlson | 251/144 |
| 3,661,355 | 5/1972 | Rawstron | 251/144 |
| 3,698,420 | 10/1972 | Grundy et al. | 251/144 |
| 3,985,150 | 10/1976 | Kindersley | 137/240 |

FOREIGN PATENT DOCUMENTS

| 826523 | 11/1969 | Canada | 251/315 |
| 1675545 | 1/1973 | Fed. Rep. of Germany | 251/315 |

Primary Examiner—A. Michael Chambers
Attorney, Agent, or Firm—Robert R. Tipton

[57] ABSTRACT

A fluid flow control valve utilizes a ball which is rotated about an axis greater than 0 degrees and less than 90 degrees to the direction of fluid flow. The ball member utilizes a fluid flow conduit through its center with a flat surface disposed at an angle to the fluid flow conduit. When in the closed position, the flat surface is disposed flush with a valve face on one port of the valve. The ball is also disposed so that its center is less than a radius length from the surface defined by the valve face.

3 Claims, 6 Drawing Figures

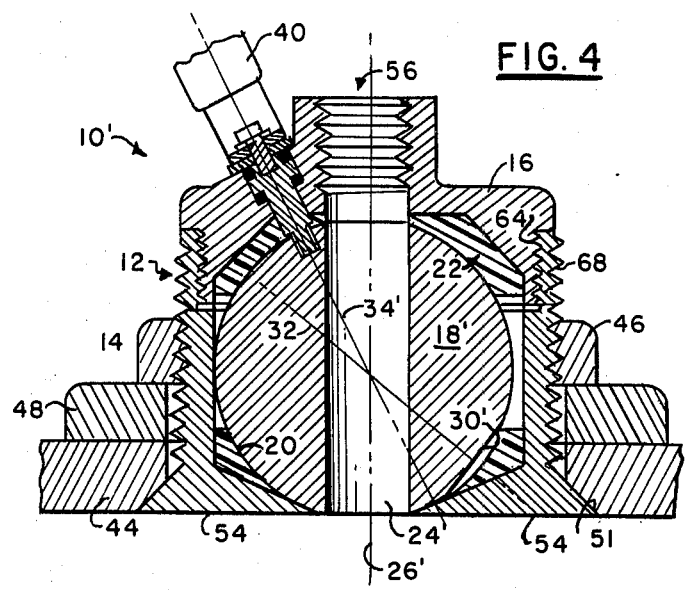
FIG. 4
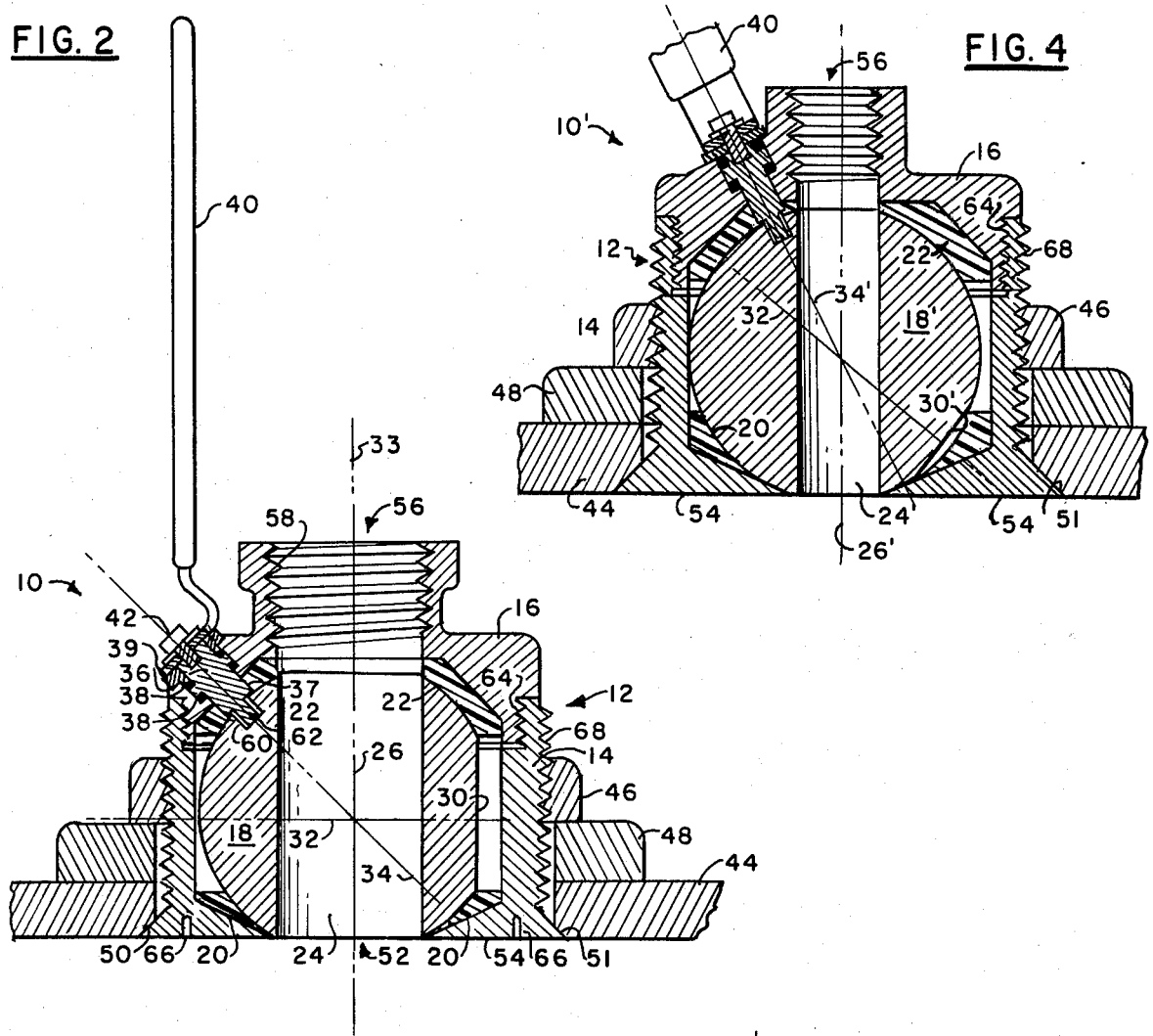
FIG. 2
FIG. 1

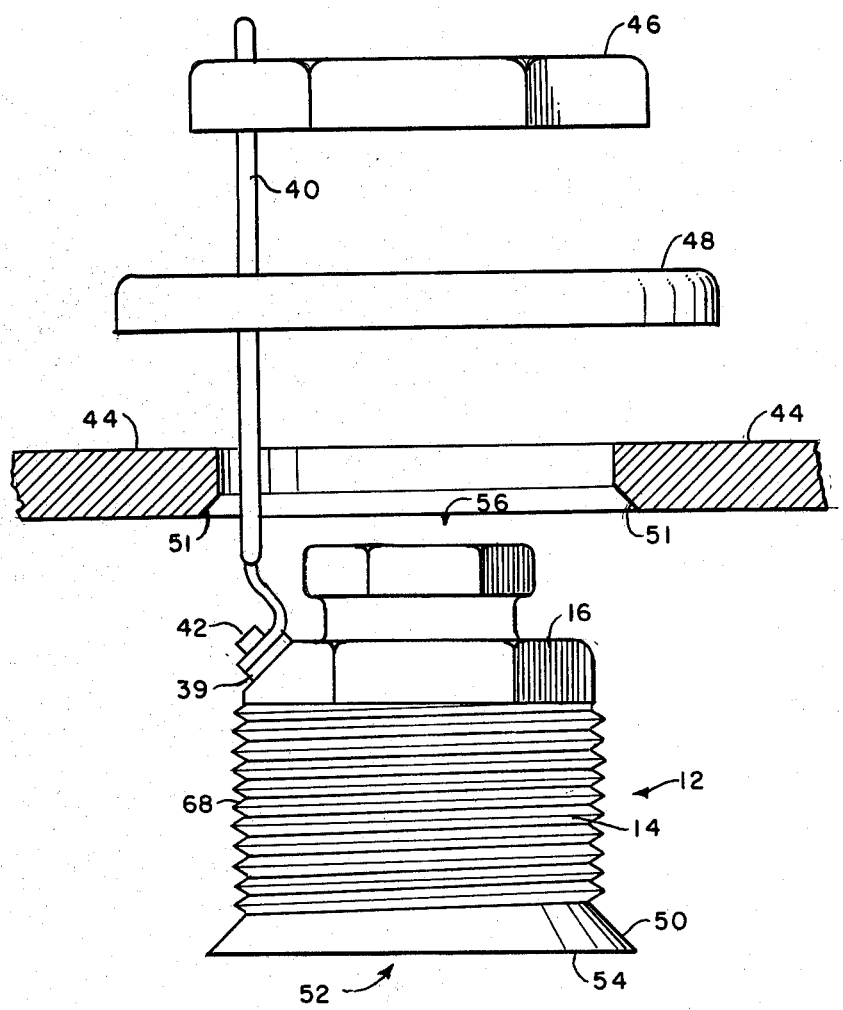

FLUSH MOUNTED SEA VALVE

BACKGROUND OF THE PRIOR ART

This invention relates generally to valves, and in particular to ball valves used as sea cocks which provide a flush surface with the ship hull or barrier wall when in the closed position.

The prior art valve used as sea cocks in most cases did not effect a flush seal with the bottom of the boat or hull surface. Instead, the prior art valves were usually mounted a short distance into the interior of the boat with a pipe connection to a through-hull fitting. Such a configuration leads to additional drag on the boat hull due to the cylindrical indention in the hull created by the through fitting, a disadvantage in racing sail boats. A further disadvantage results because the opening in the hull to the sea valve is susceptable to fouling from marine growth and corrosion. In addition, any leak in the through-fitting is not abated by operation of the sea valve.

The prior art sea valves which do provide a closure which is flush with the hull surface generally operate on a principle analogous to a piston. The valve member is usually a disc-shaped plug. Even though a flush seal is created, the sealing surfaces are generally exposed to the sea water when the valve is open thus exposing them to fouling and corrosion. These prior art valves also tend to be large, weigh more and extend some distance into the boat thus requiring more clearance. Because they are large and somewhat more complex to manufacture, they are, of course, more expensive. Also, since the plug is moved into and out of position by a stem that must pass though the valve body, additional seals are required, and these seals are of the sliding type which are not usually as reliable as the simple rotating stem seals used with ball valves. In addition, the flow of fluid through the valve is not in a straight line thus increasing the turbulence of the fluid through the valve resulting in a decrease in the rate of fluid flow for a given valve bore diameter. Because the prior art valves operated in a manner not typical of commonly known valves, the user had to stop to find out what to do to open or close the valve. Such delay might be disastrous in an emergency situation.

Although the sea valve of the present invention is described for use in a ship's hull, it can also be used for other purposes such as a drain valve for tanks in order to eliminate impurities in the initial flow of fluid when the valve is first opened. For example, tanks containing slurries will tend to clog the valves of the prior art which have a space between the valve face and the ball member. The slurries tend to collect in this space and either clog the valve or cause impurities to deposit in this space. By using the valve of the present invention, there is no place for such material to collect. Also, in situations where a tee connection is made to a pipe, the valve of the present invention will not form any cavities to cause turbulences in the fluid flowing in the pipe. Where the pipe contains corrosive material, the valve of the present invention is particularly advantageous since it prevents turbulences which tend to cause excessive corrosion of the pipe downstream from the valve.

SUMMARY OF THE INVENTION

The valve of the present invention utilizes a ball member having a fluid flow conduit therethrough and a flat portion on its outer surface, which ball member is rotated about an axis of rotation greater than 0 degrees up to and including 90 degrees with respect to the axis of fluid flow or the axis of the valve perpendicular to the boat hull or a plane defined by the valve face, whereby the flat surface of the ball member becomes flush with a valve face and the boat hull when the valve is in the closed position.

It is, therefore, an object of the present invention to provide a valve for controlling the flow of fluid though a barrier wall.

It is another object of the present invention to provide a valve for controlling the flow of fluid through a barrier wall or ship hull in which the exterior surface or face of the valve is flush with the exterior surface of the hull or barrier wall when the valve is in the closed position.

It is another object of the present invention to provide a valve for the control of fluid flow through a barrier wall or ship hull in which a ball is used as the flow control means.

It is yet another object of the present invention to provide a ball valve for the control of fluid flow through a barrier wall in which the ball is rotated about an axis making an angle greater than 0 degrees up to and including 90 degrees with the axis of the valve perpendicular to the barrier wall.

It is yet another object of the present invention to provide a ball valve for controlling the flow of fluid though a barrier wall wherein the center of the ball is located a distance from the plane defined by one of the valve faces less than the radius of the ball.

It is still another object of the present invention to provide a valve for the control of fluid flow though a barrier wall in which the valve body and operating handle can pass through the opening in the barrier wall without disassembly of the valve.

It is another object of the present invention to provide a valve for use in tanks and pipe outlets which has its surface flush with the inner surface of the tank or pipe wall to prevent collection of material in the valve entrance and to prevent turbulance in the fluid flowing in the pipe.

These and other objects of the present invention will become manifest upon study of the following detailed description when taken together with the drawings.

BRIEF DESCRIPTION OF THE DRAWINGS

FIG. 1 is a cross-sectional, elevational view of the valve of the present invention showing the valve in the closed position.

FIG. 2 is a cross-sectional, elevational view of the valve of the present invention showing the valve in the open position.

FIG. 3 is a partial exploded view of the valve of the present invention showing its assembly through the barrier wall or ship hull.

FIG. 4 is a cross-sectional, elevational view of a further embodiment of the present invention showing the flat portion of the ball member at an angle other than 45 degrees to the axis of rotation of the ball member.

DESCRIPTION OF THE PREFERRED EMBODIMENT

Figure 5A:
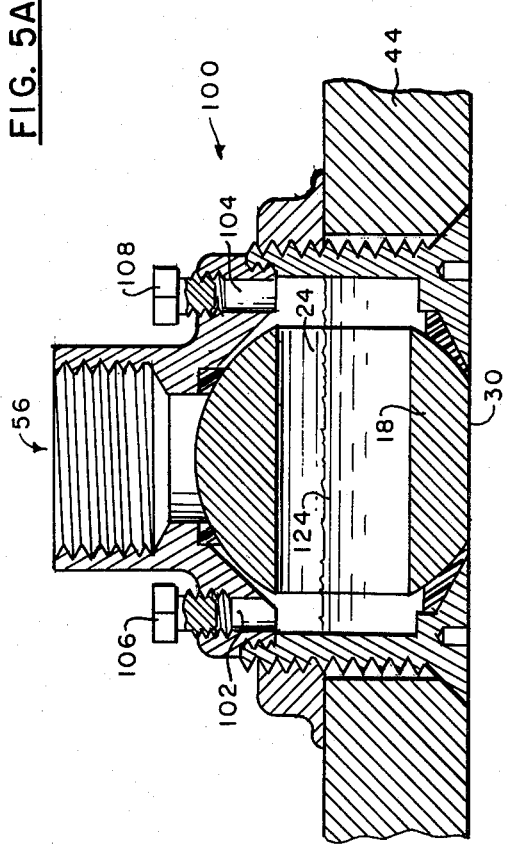
FIGS. 5A and 5B illustrate a method of removing this entrapped water without having to open the valve.

With reference to FIG. 1, valve 10 is shown in the closed position and comprises, basically, a valve body member 12 comprising a valve body base fitting 14 which is connected to valve body cap fitting 16, both of which fittings enclose a ball member 18 held in position therein by first ball seal bearing member 20 and second ball seal bearing member 22. Ball member 18 further comprises means defining a hole or conduit 24 therethrough having an axis of rotation 26, and a ball member flat surface face, facet or portion 30 having an axis of rotation 32 perpendicular thereto. Ball member 18 is rotated about its axis of rotation 34 by valve stem 36 which passes through bearing 37 in valve body cap fitting 16 and is sealed to prevent leakage by valve stem seals 38.

An operating handle 40 is attached to valve stem 36 typically by machine screw 42. Other methods can be used such as a threaded stem with a nut fastener.

Valve 10 is connected to hull or barrier wall 44 by means of retainer ring 46 which is adapted to engage valve body base fitting 14 and compress against spacer fitting 48. Spacer fitting 48 is adapted to conform to any curvature of the hull 44 at the point of installation of valve 10.

Valve body base fitting 14 also comprises a first port 52 having a first valve face 54 which is adapted to be flush with the outer surface with hull or barrier wall 44. It is also adapted to be flush with ball member flat surface 30 when ball valve 10 is in the closed position as shown in FIG. 1. It will also be noted that when the valve is in the closed position the plane defined by ball member flat surface 30 is also perpendicular to valve axis of rotation 32.

Valve 10 further comprises a first port flange lip 50 about the outer peripheral edge of first port 52. First port flange lip 50 is adapted to engage the countersunk or bevelled portion 51 of the hole through hull 44 in order to afford a water tight seal while under compression by retainer ring 46.

Second port 56, located in valve body cap fitting 16, comprises a threaded portion 58 adapted to receive any standard pipe or hose fitting. Although threaded portion 18 is shown as a female connection, it can also be adapted to be a male fitting with threads located on the exterior surface of the corresponding portion of valve body cap fitting 16. It can also be adapted to receive a hose and clamp connection.

In the embodiments illustrated in FIGS. 1 and 2, the axis of rotation 26 of hole 24 is shown passing through the center of ball member 18. Also, the axis 32 passing though the center of ball member flat portion 30 which is perpendicular to the plane of that surface, also passes through the center of ball member 18 at an angle of 90 degrees to the axis of rotation 26 of hole 24. It will additionally be noted that the axis of rotation 34 of valve stem 36 also passes through the center of ball member 18, but at a 45 degree angle to axis of rotation 26 of conduit 24 and axis of rotation 32 perpendicular to flat surface 30. In other words, axis of rotation 34 bisects the angle defined by axis of rotation 26 and axis of rotation 32.

It will also be noted that valve operating handle 40 is also disposed at a 45 degree angle to the axis of rotation 34 of valve stem 36.

With reference to FIG. 2, valve 10 is shown in the open position whereby the axis of rotation 26 of hole or conduit 24 is now coincident with the vertical axis of the valve extending through the centers of first port 52 and second port 56 whereby hole or conduit 24 is now in fluid communication between first port 52 and second port 56. Ball member flat surface 30 has thus been rotated to a position within valve body member 12. It will also be noted that valve operating handle 40 is now in the vertical position parallel to the axis of flow of fluid through valve 10.

Thus, valve operating handle 40 is rotated an angle of 180 degrees from an open to a closed position of the valve.

With reference to FIG. 3, with the handle position shown in FIG. 2, it can be seen that valve 10 of the present invention can easily pass through the opening in barrier wall or ship hull 44 without removal or modification of the valve or valve body itself.

To install the valve 10 of the present invention, one merely has to drill a hole in the barrier wall or ship hull 44 sufficient to clear the outside thread diameter of valve body base fitting 14, then bevel or countersink the edges of the hole to receive first port flange lip 50 thereby maintaining a water tight seal when retainer ring 46, in conjunction with spacer fitting 48, are attached to valve body member base fitting 14.

As a variation, valve body base fitting 14 can have relatively short side walls while valve body cap fitting 16 can have relatively long side walls which extend down to surround ball member 18. Valve body base fitting 14 could also be formed as a plug to fit into the bottom portion of valve body cap fitting 16 whose side walls extend downward about ball member 18 to terminate in flange lip 50.

Although FIGS. 1 and 2 illustrate a valve configuration in which the ball member flat surface 30 and the hole or conduit 24 are disposed 90 degrees about ball member 18, it is not always necessary to provide this angular relationship. With reference to FIG. 4, ball flat surface 30' can be disposed at less than 90 degrees with respect to hole of conduit 24'. With such a configuration, however, the axis of rotation 34' of valve stem 36' must bisect the angle made by the axis 32' perpendicular to ball member flat surface 30' and the axis 26' of hole or conduit 24'. The smallest angular relationship between the two elements will be primarily determined by the diameters of flat surface 30' the diameter of hole or conduit 24' and the diameter or radius of ball member 18'. The angle operating handle 40 makes with valve stem 36 would also have to be modified to allow for the new axis of rotation.

Also by shifting the position of ball member flat surface 30' more toward its rotated position to the closed position relative to hole 24', the angular rotation of valve operating handle 40' can be decreased.

For example, if flat portion 30 in FIG. 2 were moved to a position on ball 18 close to port 52, operating handle 40 could then be rotated less than 180 degrees for complete closure of valve 10. Of course, axis 32 would still have to pass through the center of ball member 18. In this configuration however, a three dimensional angular relationship would result. The angle made by axis 32 and axis 34 would have to be equal to the angle made by axis 26 and axis 34. The sum of these two angles would not be equal to the angle made by axis 26 and axis 32 since they do not lie in the same plane.

An important configuration of valve 10 of the present invention is the location of the center of ball member 18. As noted in FIG. 1, the distance from the center of ball member 18 to the plane defined by first valve face 54, which plane is, in FIG. 1, coincident with ball member flat surface or portion 30, is less than the radius of ball member 18.

Valve 10 can be fabricated from any material, preferably that which is corrosion resistant to sea water, such as brass, bronze or stainless steel. Preferably first ball seal bearing member 20 and second ball seal bearing member 22 can be fabricated out of any resilient material such a rubber or plastic. In a similar manner, spacer fitting 48 can be fabricated out of any material which can be modified to conform to the contours and surface irregularities of barrier wall or hull 44.

To rotate ball member 18, a slot 60 is milled into ball member 18, which slot is adapted to receive tenon 62 machined into the end of valve stem 36. Other methods can be used such as square or star shaped recesses and stems which permit rotation of ball member 18.

To assemble valve 10 of the present invention, second ball seal bearing member 22 is placed in valve body cap fitting 16 as shown in FIGS. 1 and 2. Ball member 18 is then place against second ball seal bearing member 22 with slot 60 in alignment with valve stem bearing 37 in valve body cap fitting 16. Valve stem 36, with its valve stem seals 38 in place, is then inserted in bearing 37 of valve body cap fitting 16 with tenon 62 being received by and engaged in slot 60 of ball member 18. Compression nut 39 is inserted in bearing 37 to hold valve stem 36 and seals 38 in place. Next, first ball seal bearing member 20 is placed within valve body base fitting 14 as shown in FIG. 1. Valve body base fitting 14 is then placed about ball member 18 to engage threads 64 of valve body cap fitting 16. Holes 66 in first valve face 54 are used in conjunction with a spanner (not shown) having pins adapted to be received in holes 66 to obtain purchase on valve body base fitting 14 when it is screwed onto valve body cap fitting 16. Valve body base fitting 14 is then screwed into valve body cap fitting 16 to the necessary tightness to achieve a liquid tight seal between ball member 18 and first and second ball seal bearing members 20 and 22, respectively. Valve operating handle 40 is then attached to valve stem 36, typically by machine screw 42 or the like. The valve is now ready for installation in a barrier wall or boat hull.

With reference to FIG. 3, operating handle 40 is placed in the vertical position as shown, and the entire unit is inserted through the hole in hull 44. Spacer fitting 48 is then place around valve body base fitting 14 about which is screwed retainer ring 46 which engages threads 68 on the outer peripheral surface of valve body through fitting 14. Holes 66 are again used to obtain purchase on the valve body while tightening retainer ring 46.

Valve 10 is now ready for operation as a sea valve.

There will be some times when the hull of a vessel utilizing the valve of the present invention will be subjected to freezing temperatures. Since conduit 24 through ball member 18 will normally be filled with water while in the closed position, the freezing of this entrapped water may be sufficient to expand and crack ball member 18 or at least cause ball member 18 to become inoperative.

Figure 5B:
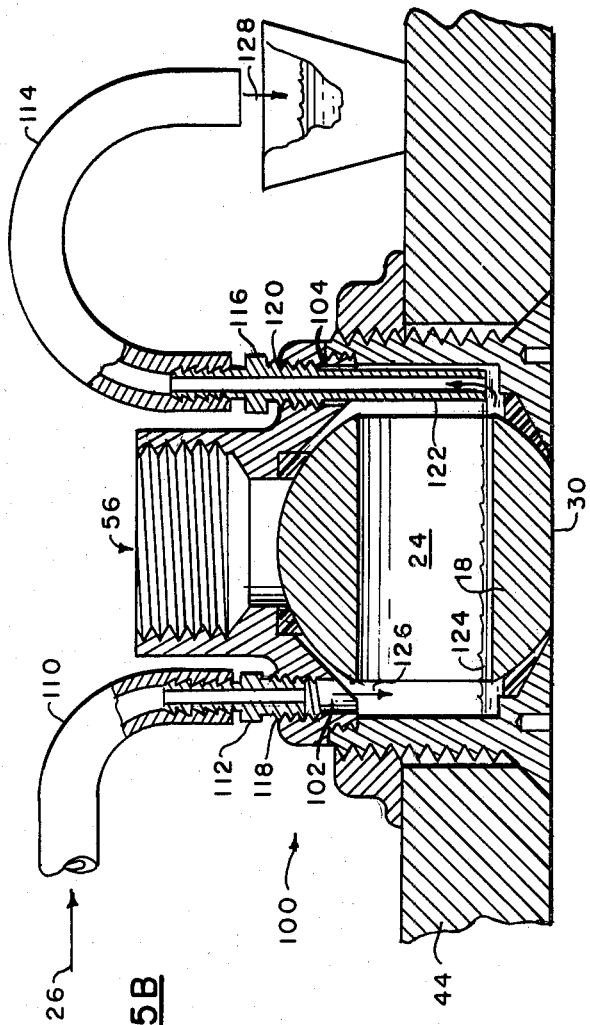

FIGS. 5A and 5B illustrate a method of removing this entrapped water without having to open the valve.

With respect to FIG. 5A, the major elements of valve 100 are essentially the same as the elements of valve 10 of FIGS. 1 and 2, with the addition, however, of a first drain port 102 and a second drain port 104.

Although drain ports 102 and 104 are shown in FIGS. 5A and 5B as apparently on opposite sides of valve body member 12, they can be located at any peripheral location relative to each other. As will be described below, the first and second drain ports could also be coaxial in configuration.

During normal operation, first drain port 102 and second drain port 104 are sealed by drain port plugs 106 and 108, respectively, as shown in FIG. 5A.

To drain valve 10, as shown in FIG. 5B, plug 106 is replaced by tubing 110 with its fitting 112 connected to drain port 102. Plug 108 is replaced by tube 114 with its fitting 116 connected to drain port 104.

Fitting 112 comprises merely a threaded portion 118 which is adapted to engage the corresponding threaded portion of drain port 102.

Fitting 114, however, comprises not only threaded portion 120 which is adapted to engage the corresponding threaded portion of drain port 104, but additionally comprises tubular extension or syphon 122 which extends downwardly with its opening proximate the bottom of the cavity defined by conduit 24 and the interior portion of valve body member 12.

To empty valve body member 12 and conduit 24 of fluid 124, air is blown into tubing 110, as shown by arrows 126, forcing the fluid 124 in the valve body up through tube extension or syphon 122 and out through tube 114, as shown by arrow 128, thus clearing the valve body of fluids.

It can also be seen that tube 114 could be coaxially disposed within tube 110 with tube extension or syphon 122 extending downwardly with its opening proximate the bottom of the cavity. Air blown through tube 110 and about the exterior of tube 114 will again cause fluids to be forced up into tube extension or syphon 122 and out through coaxially located tube 114.

It can also be seen that extension tube 122 could be replaced by having the bottom opening of second drain port 104 located proximate the bottom portion of the cavity to be drained within valve body 12. Tube extension 122 would thus become a part of the valve body.

I claim:

1. A valve for controlling the flow of fluid through an opening in a barrier wall comprising
   means defining a valve body comprising
   means defining spaced first and second parts, said parts having a central axis, said body including a valve face defining an imaginary geometric surface generally flush with the surface of said barrier wall, and generally perpendicular to said central axis, said second port passing through said barrier wall,
   a flow control member disposed between said first and second ports comprising
   a ball member having a center and means defining a conduit therethrough, said central axis being coincident with the axis of said conduit when said ball member is in the open position,
   a seal bearing member adapted to hold said ball member between said first and second ports, with the center of said ball member located along said conduit axis such that the distance measured along said central axis of said parts from said geometric surface defined by said valve body face to said center of said ball member is less than the radius of said ball member when said ball member is in the closed position,
   means defining a generally flat surface on said ball member, and
   means for rotating said ball member between an open position in which said conduit in said ball is in fluid communication with said first port and said second port and a closed position in which said flat surface of said ball member is flush with said valve body face and said second port, said means for rotating said ball member having an axis of rotation bisecting the angle defined by the intersection of the axis of said conduit through said ball member and the axis perpendicular to and passing through the center on said flat surface of said ball member.

2. The valve as claimed in claim 1 further comprising means for draining fluid from said conduit through said ball member when said ball member is in the closed position.

3. The valve as claimed in claim 2 wherein said means for draining said conduit in said ball member comprises
a first drain port,
a second drain port,
a syphon connected to said second drain port having its opening proximate the lower portion of said conduit.

* * * * *